United States Patent [19]

Idogaki et al.

[11] Patent Number: 4,496,134
[45] Date of Patent: Jan. 29, 1985

[54] ROTARY SOLENOID ACTUATOR

[75] Inventors: Takaharu Idogaki, Okazaki; Hisasi Kawai, Toyohashi; Kyo Hattori, Susono; Kazuhiro Sakurai, Gotenba, all of Japan

[73] Assignees: Nippon Soken, Inc., Nishio; Toyota Jidosha Kogyo Kabushiki Kaisha, Toyota, both of Japan

[21] Appl. No.: 296,805

[22] Filed: Aug. 27, 1981

[30] Foreign Application Priority Data

Sep. 3, 1980 [JP] Japan ................. 55-122752

[51] Int. Cl.³ .............................. F16K 31/08
[52] U.S. Cl. ..................... 251/65; 251/129; 251/137; 335/230; 335/272
[58] Field of Search ........... 251/65, 129, 137, 133; 335/272, 230

[56] References Cited

U.S. PATENT DOCUMENTS

| 2,405,429 | 8/1946 | Jewell | 335/272 X |
| 2,473,939 | 6/1949 | Clark | 335/230 |
| 2,841,779 | 7/1958 | Peterson, Jr. | 335/230 X |
| 2,872,154 | 2/1959 | Jones | 251/133 |
| 3,054,426 | 9/1962 | Fritz et al. | 251/133 X |
| 3,206,160 | 9/1965 | Bennett | 251/65 |
| 3,323,548 | 6/1967 | Lugwig | 137/625.65 |
| 3,861,644 | 1/1975 | Knape | 251/129 X |
| 4,135,119 | 1/1979 | Brosens | 318/128 |

FOREIGN PATENT DOCUMENTS 634529 12/1957 Canada ................. 251/137

OTHER PUBLICATIONS

Nishimiya et al., "Proportional Solenoid", Technical Report (Kokai Giho), vol. 3-5, No. 78-780, published May 20, 1978.

Primary Examiner—Arnold Rosenthal
Attorney, Agent, or Firm—Kenyon & Kenyon

[57] ABSTRACT

A rotary solenoid actuator for proportionally controlling the flow of fluid, such as air, in a pipe comprises a housing with a rotor rotatably mounted thereon. A stationary coreless coil for generating a magnetic field in response to a control current therethrough is mounted in the housing. A permanent magnet is affixed to a rotatably mounted shaft within the coil, and a return spring is attached to the rotating shaft. Due to low hysteresis in the coreless coil, there is a linear relationship between the control current and the fluid flow.

6 Claims, 8 Drawing Figures

ROTARY SOLENOID ACTUATOR

BACKGROUND OF THE INVENTION

1. Field of the Invention

The present invention relates to a rotary solenoid actuator for proportionally controlling the air flow in a pipe which is used, for example, in a secondary air flow control unit or the like of an automobile. In this actuator, the angle of a rotating shaft is determined by the balance between the rotating force of a permanent magnet and the resilient force of a return spring.

2. Description of the Prior Art

One conventional linear type solenoid actuator for proportionally controlling the flow of fluid, such as air in a pipe, comprises a core, a coil wound on the core, and a plunger coaxially located within a valve housing. In addition, an air passage is formed along the axis penetrating the core and the plunger. In such an actuator, when a control current flows through the coil, the coil generates a magnetic field that causes the plunger to move towards the core. As a result, the flow of air through the pipe is approximately proportional to the control current.

However, in the above-mentioned conventional actuator, the relationship between the control current and the traveling distance of the plunger is nonlinear due to a large hysteresis, so that the flow of air is not always a linear function of the control current. In addition, the stroke of the plunger is small and accordingly, the air passage is small so that the maximum flow of air therethrough is small. Further, the flow of air is subjected to external vibration, since the plunger moved rectilinearly.

SUMMARY OF THE INVENTION

It is a principal object of the present invention to provide a rotary solenoid actuator for controlling the flow of fluid in a pipe to cause the flow to be proportional to a control current applied to the actuator.

It is another object of the present invention to provide a rotary solenoid actuator for proportionally controlling the flow of fluid in a pipe, in which the maximum flow is relatively large and the flow is not subjected to external vibration.

According to the present invention, a rotary solenoid actuator for proportionally controlling the flow of fluid in a pipe includes: a housing mounted on the pipe and a valve rotor rotatably disposed within the housing. A coreless coil is attached to the housing for generating a magnetic field in response to a control current flowing therethrough. The valve rotor and permanent magnet are mounted on a rotatable shaft, with the magnet located within the coreless coil, and a return spring having one end attached to the rotating shaft and another end attached to the housing is provided to bias the shaft to a certain position.

The present invention will now be more clearly understood from the following description contrasted with the conventional device and with reference to the accompanying drawings.

DETAILED DESCRIPTION OF THE PREFERRED EMBODIMENT

Before the explanation of the preferred embodiments, a conventional device will now be explained.

Figure 1:
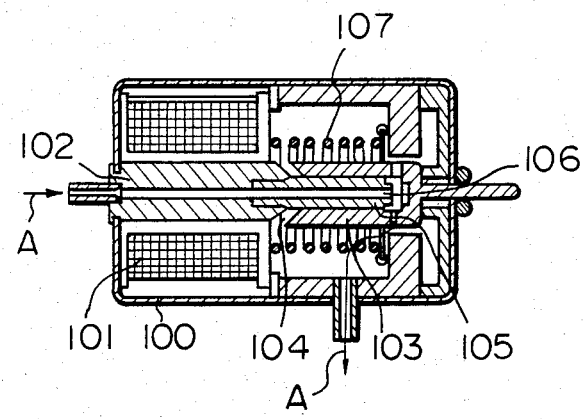
FIG. 1 is a cross-sectional view illustrating a conventional linear type solenoid actuator.

FIG. 1 illustrates a conventional linear type solenoid actuator that includes a cylindrical valve housing 100; a cylindrical coil 101; a core 102 within the coil 101; a plunger 103; an air gap 104 between the core 102 and the plunger 103; an oil-impregnated plastic member 105 for slidably supporting the plunger 103; an air passage 106; and a spring 107. In FIG. 1, when a control current flows through the coil 101, the coil 101 associated with the core 102 generates a magnetic field so that the plunger 103 is moved toward the core 103. In this case, it should be noted that the traveling distance of the plunger 103 is dependent upon the magnitude of the magnetic field and the strength of the spring 107. In other words, the flow of air indicated by arrows A into the air passage 106 may be in proportion to the magnetic field, that is, the control current.

However, in the device of FIG. 1, the traveling distance of the plunger 103 is nonlinear with respect to the control current due to the large hysteresis in the core 102, so that the relationship between the control current and the flow of air is not always linear. In addition, the stroke of the plunger 103, which is equal to the length of the air gap 104, is small, for example, about 5 mm. Accordingly, if the device of FIG. 1 is applied to an exhaust gas control unit of an automobile which requires the flow of air to be from 0 to 600 liters per minute, the diameter of the air passage 106 should be more than 14 mm, which would require the entire device of FIG. 1 to be quite large. Further, since the plunger 103 moves in a rectilinear mode, the flow of air is subjected to external vibration.

Figure 2:
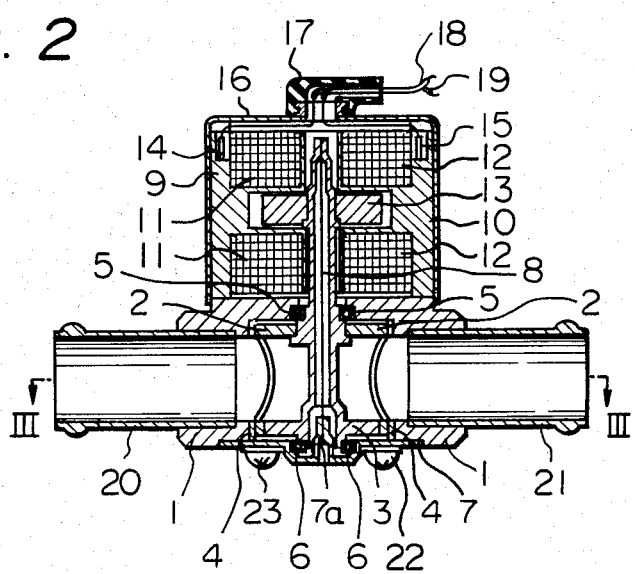
FIG. 2 is a cross-sectional view illustrating an embodiment of the rotary solenoid actuator according to the present invention.

FIG. 2 is a cross-sectional view illustrating an embodiment of the rotary solenoid actuator according to the present invention. In FIG. 2, the actuator includes a housing 1 which is made of, for example, aluminium, and a valve rotor rotatably disposed within the valve housing 1 and made of, for example, stainless steel. In this case, the valve housing 1 and the valve rotor 2 serve as a main portion for controlling the flow of fluid. The actuator also includes a rotating hollow shaft affixed to the valve rotor 2 and made of, for example, stainless steel, and a valve bushing 4 which is made of, for example, stainless steel. The valve bushing 4 is force-fitted into the valve housing 1 and the spacing between the valve bushing 4 and the valve rotor 2 is approximately 0.04 mm. Bearings 5 and 6 are provided for supporting the rotating shaft 3 and an end plate 7 is provided for supporting the valve rotor 2 through the bearing 6. A torsion bar 8 within the hollow of the rotating shaft 3 serves as a return spring. The torsion bar 8 is made of stainless steel having a diameter of approximately 0.5 mm. In this case, one end of the torsion bar 8 is affixed to the projection 7a of the end plate 7 by, and thus to the valve housing 1 by caulking, while the other end is attached to the rotating shaft 3 by caulking. The rotating shaft 3 is force-fitted into the bearings 5 and 6, while the outside of the bearing 5 is force-fitted into the valve housing 1 and the outside of the bearing 6 is force-fitted into the end plate 7. A pair of bobbins 9 and 10 on which coils 11 and 12 are wound are associated with a cover 16 and are attached to the valve housing 1. The bobbins 9 and 10 are preferably made of aluminium on which insulating material such as Teflon is coated, in order to improve heat dissipation. It should be noted that the bobbins 9 and 10 are non-magnetic and accordingly, the coils 11 and 12 are coreless coils. A disk type permanent magnet 13 is force-fitted onto the rotating shaft 3 within the spaces formed by the bobbins 9 and 10 and out of contact with the bobbins. As a result, the permanent magnet 13 is rotatably disposed within the coils 11 and 12. Junction terminals 14 and 15 are force-fitted into the bobbins 9 and 10, respectively. One end of the coil 11 is soldered at the junction terminal 14, where it is connected to a lead wire 18. The other end of the coil 11 is connected to one end portion of the coil 12 and the other end of the coil 12 is soldered at the junction terminal 15 and is connected to a lead wire 19. Therefore, the two coils 11 and 12 serve as one coil. However, the division of the coil into two parts 11 and 12 makes it easy to accommodate the permanent magnet 13 therein. A bushing 17 attached to the cover 16 supports the lead wires 18 and 19. Pipes 20 and 21 are connected to opposite sides of the valve housing 1 and have, for example, an inner diameter of 14 mm and an outer diameter of 16 mm. The pipes 20 and 21 may be connected to pipes (not shown) for supplying secondary air to an internal combustion engine.

Figure 3:
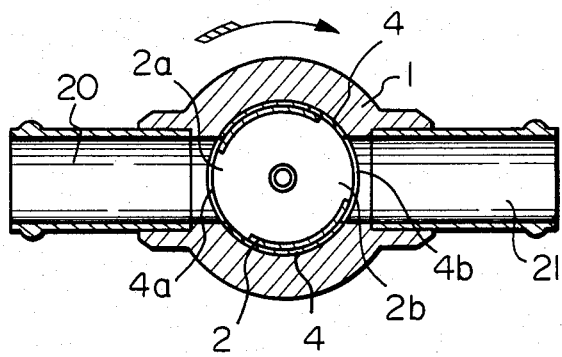
FIG. 3 is a cross-sectional view taken along the lines III—III in FIG. 2.

FIG. 3 is a cross-sectional view taken along the lines III—III in FIG. 2. As illustrated in FIG. 3, the valve rotor 2 has two openings 2a and 2b opposed to each other, while the valve bushing 4 has two openings 4a and 4b which are equal in size to the openings 2a and 2b of the pipes 20 and 21, respectively. Therefore, the area of an air passage for connecting the pipes 20 and 21 to each other is controlled by rotating the valve rotor 2.

Figure 4:
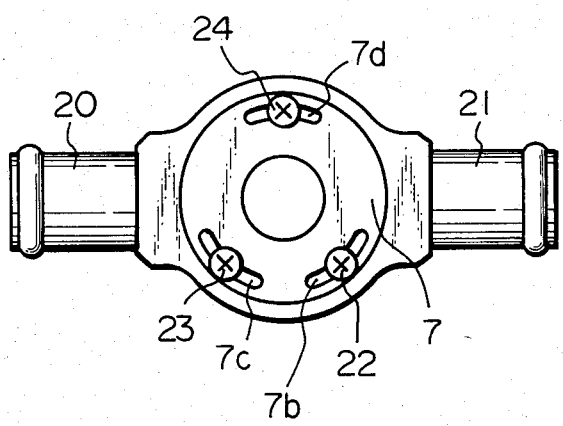
FIG. 4 is a bottom plan view of FIG. 2.

FIG. 4 is a bottom plan view of FIG. 2. As illustrated in FIG. 4, the end plate 7 has three elongated holes 7b, 7c and 7d through which three screws 22, 23 and 24 are threaded. This permits the torsion bar 8 to be controlled by adjusting the positions of the screws 22, 23 and 24 within the holes 7b, 7c and 7d.

Figure 5:
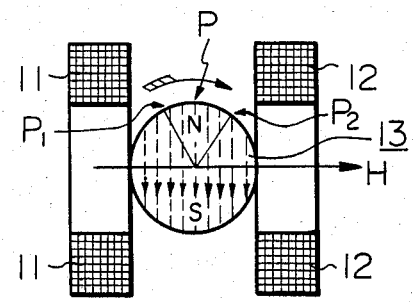
FIG. 5 is a diagram for explaining the operation of the device of FIG. 2.

The operation of the device of FIG. 2 will now be explained with reference to FIG. 5. As illustrated in FIG. 5, the rotating permanent magnet 13 is magnetized in a direction perpendicular to its axis. The dotted lines indicate lines of magnetic force and a location P indicates the region of maximum magnetic field strength of the north pole N. When a control current is supplied to the coils 11 and 12, a magnetic field, as indicated by an arrow H, is generated. As a result, the magnet 13 is forced to rotate to a position in which the electromagnetic force induced in the magnet 13 is equal to the return force of the torsion bar 8. Of course, the magnet 13 can be rotated within a range of 180°, but in this embodiment, the range is approximately 60°. That is, when no control current is supplied to the coil 11 and 12, the region P of the magnet 13 is located at a position indicated by $P_1$, while, when the maximum control current is supplied to the coils 11 and 12, the region P of the magnet 13 is located at a position indicated by $P_2$. In this case, the angle between the positions $P_1$ and $P_2$, with respect to the center of the magnet 13, is 60°.

It should be noted that the rotational angle of the magnet 13 is in proportion to the magnitude of the control current flowing through the coils 11 and 12, since the electromagnetic force induced in the magnet 13 is dependent upon only the control current.

The above-mentioned rotation of the magnet 13 causes the rotating shaft 3 and the valve rotor 2 to be rotated, so that the flow of air in the pipes 20 and 21 is controlled. In this case, in order to improve the durability of the torsion bar 8, it is preferable that the torsion angle of the torsion bar 8 be as small as possible. In this regard, the rotating shaft 3 for accommodating the torsion bar 8 is relatively long.

Figure 6:
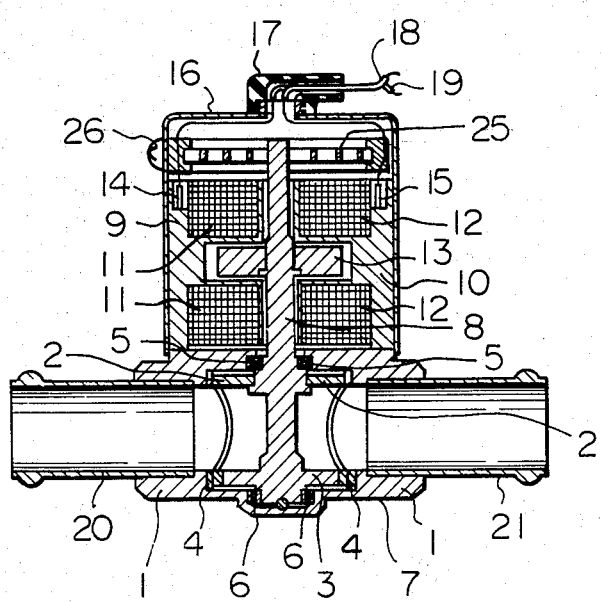
FIG. 6 is a cross-sectional view illustrating another embodiment of the rotary solenoid actuator according to the present invention.

FIG. 6 is a cross-sectional view illustrating another embodiment of the rotary solenoid actuator according to the present invention. In FIG. 6, the elements which are the same as those of FIG. 2 are denoted by the same reference numerals. In FIG. 6, a coil spring 25 is provided instead of the torsion bar 8 of FIG. 2. The position of the coil spring 25 is adjusted by a screw 26. In this case, the coil spring 25 serves the same purpose as the torsion bar 8 of FIG. 2 and, accordingly, the operation of the device of FIG. 6 is the same as that of the device of FIG. 2.

In the above-mentioned embodiments, oilless metals can be used instead of the bearings 5 and 6.

In order to enhance the strength of a magnetic field induced by a control current flowing through the coils 11 and 12, one approach is to provide magnetic cores within the coils 11 and 12 but in that case, even if no control current flows, attraction between the magnet 13 and such cores would be generated. As a result, the characteristics of the angle of rotation of the magnet 13 with respect to the control current would be deteriorated due to the non-linear effect of hysteresis.

Figure 7:
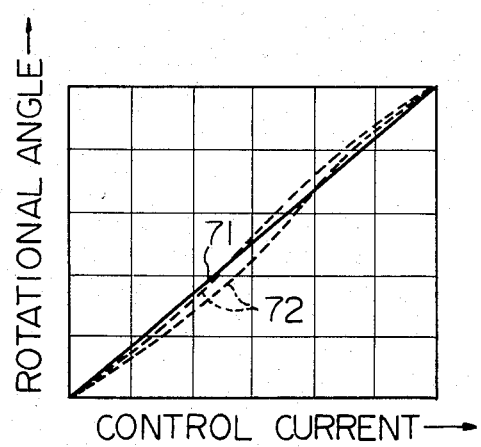
FIG. 7 is a graph showing the rotational angle characteristics of the magnet 13.
Figure 8:
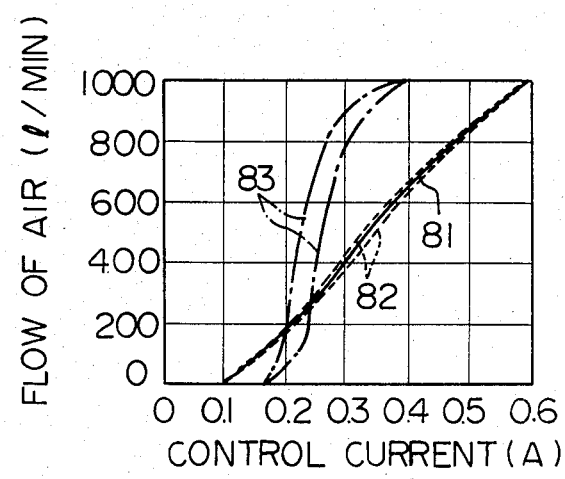
FIG. 8 is a graph showing the flow characteristics of air.

FIG. 7 is a graph showing the rotational angle characteristics of the magnet 13. In FIG. 7, a solid curve 71 indicates the case according to the present invention, while, a dotted curve 72 indicates the case in which there are magnetic cores within the coils 11 and 12. FIG. 8 is a graph showing the flow characteristics of air. In FIG. 8, the difference in pressure between the pipes 20 and 21 of FIGS. 2 and 6 is 200 mmHg. In addition, a solid curve 81 indicates the case according to the present invention; a dotted curve 82 indicates the case having cores within the coils 11 and 12; and a dot and dash curve 83 indicates the case of FIG. 1. As can be understood from FIGS. 7 and 8, according to the present invention, the linear characteristics due to small hysteresis can be obtained.

It should be noted that the rotary solenoid actuator according to the present invention can also be used for driving other rotating means than the above-mentioned valve.

As explained hereinbefore, the present invention has the following advantages, as compared with the conventional device of FIG. 1.

(1) The flow of fluid (air) is always proportional to the control current, since the rotational angle of the magnet 13 is proportional to the control current due to the fact that the structure does not include magnetic cores that would cause hysteresis.

(2) The maximum flow of fluid (air) is relatively large, since the area of an air passage can be easily almost the same as that of the pipe.

(3) The flow of fluid (air) is not subjected to external vibration, since the air passage is controlled by rotating the valve rotor 2 with respect to the pipe; that is, the motion of the valve rotor 2 is two-dimensional.

We claim:

1. A rotary solenoid actuator for proportionally controlling the flow of fluid in a pipe, comprising:

a housing mounted on said pipe;

a coreless coil, attached to said housing, for generating a magnetic field in response to a control current flowing therethrough, said coreless coil having two coaxial coil sections;

a rotatable shaft disposed in a space between the coil sections of said coreless coil and having a longitudinal axis that is approximately perpendicular to the magnetic axis of said coreless coil;

a rotatable permanent magnet fixed coaxially to said rotatable shaft and disposed within said coreless coil;

a return spring having one end attached to said shaft and the other end attached to said housing; and a valve rotor rotatably disposed within the housing, the valve rotor being fixed to said rotatable shaft and being coaxial to said rotatable permanent magnet, and wherein said rotatable shaft is a hollow shaft, and said return spring comprises a torsion bar disposed within said hollow shaft.

2. A rotary solenoid actuator according to claim 1 wherein said coreless coil is divided into two parts so as to accommodate said rotatable permanent magnet between said two parts.

3. A rotary solenoid actuator according to claim 1, further comprising screw means for adjusting said return spring.

4. A rotary solenoid actuator according to claim 1, further comprising at least one bobbin surrounding said permanent magnet and on which said coil is wound.

5. A rotary solenoid actuator according to claim 4 wherein the bobbin comprises an aluminum structure having a coating of insulating material.

6. A rotary solenoid actuator according to claim 1 wherein said valve rotor has two openings opposed to each other and alignable with said pipe.

* * * * *